United States Patent
Bich et al.

(10) Patent No.: US 7,426,819 B2
(45) Date of Patent: Sep. 23, 2008

(54) AUGER FINGER WITH RESILIENT ELASTOMERIC RETAINER RETRACTOR AT BREAKING POINT

(75) Inventors: Gary L. Bich, New Holland, PA (US); Imants Ekis, Leola, PA (US); Ryan Figgins, New Holland, PA (US); James F. Rayfield, New Holland, PA (US)

(73) Assignee: CNH America LLC, New Holland, PA (US)

( * ) Notice: Subject to any disclaimer, the term of this patent is extended or adjusted under 35 U.S.C. 154(b) by 17 days.

(21) Appl. No.: 11/544,684

(22) Filed: Oct. 6, 2006

(65) Prior Publication Data
US 2008/0083203 A1    Apr. 10, 2008

(51) Int. Cl.
*A01D 43/02* (2006.01)
*A01D 89/00* (2006.01)

(52) U.S. Cl. .......................... 56/364; 198/518; 198/693

(58) Field of Classification Search ................... 56/364, 56/330, 12.4; D15/28; D8/14; 460/16, 114, 460/20; 198/518, 693, 579, 513, 613
See application file for complete search history.

(56) References Cited

U.S. PATENT DOCUMENTS

| | | | | |
|---|---|---|---|---|
| 2,696,290 A | * | 12/1954 | Carroll | 198/720 |
| 2,701,634 A | * | 2/1955 | Carroll | 198/518 |
| 3,126,693 A | | 3/1964 | Renn | 56/364 |
| 3,261,153 A | | 7/1966 | Johnston | 56/400 |
| 3,295,302 A | | 1/1967 | Lee | 56/364 |
| 3,323,196 A | | 6/1967 | Renn | 29/121 |
| 3,348,706 A | * | 10/1967 | Hyman | 414/503 |
| 3,619,993 A | | 11/1971 | Maffei | 56/12.4 |
| 4,112,657 A | | 9/1978 | Benac et al. | 56/330 |
| 4,145,866 A | | 3/1979 | Zweegers | 56/400 |
| 4,271,956 A | * | 6/1981 | Hutchinson et al. | 198/613 |
| 4,706,448 A | | 11/1987 | Gessel et al. | 56/400 |
| 4,745,736 A | | 5/1988 | Copley | 56/400 |
| 5,540,004 A | * | 7/1996 | Patterson et al. | 37/244 |
| 6,244,955 B1 | * | 6/2001 | Bischoff et al. | 460/16 |
| 6,668,534 B2 | | 12/2003 | Sheedy et al. | 56/364 |
| 2006/0252472 A1 | * | 11/2006 | Lanzinger | 460/20 |
| 2007/0022727 A1 | * | 2/2007 | Bich et al. | 56/364 |

FOREIGN PATENT DOCUMENTS

EP     371372 A1 *  6/1990

* cited by examiner

*Primary Examiner*—Árpád Fábián-Kovács
(74) *Attorney, Agent, or Firm*—Michael G. Harms; John William Stader; Patrick M. Sheldrake

(57) ABSTRACT

A finger for a crop gathering auger of a grain header for an agricultural combine, a forage harvester, or the like, the finger including a resilient elastomeric retainer retractor which spans a failure region of the finger and will retain a free end of the finger in connection with a mounting end thereof when the failure region is broken, and which is configured and operable for automatically retracting the broken off free end into an auger drum and retaining it therein during subsequent rotation of the drum for limiting potential damage from the broken end and preventing entry of the broken end into crop handling equipment of the combine or other machine.

31 Claims, 9 Drawing Sheets

AUGER FINGER WITH RESILIENT ELASTOMERIC RETAINER RETRACTOR AT BREAKING POINT

TECHNICAL FIELD

This invention relates generally to a finger for a crop gathering auger of a grain header for an agricultural combine, and more particularly, to an auger finger including a resilient elastomeric retainer retractor which spans a failure region of the finger and will retain and allow resilient pivotal movement of a free end of the finger in connection with a mounting end thereof when the failure region is broken without the retainer retractor itself being subject to failure as a result of the breakage of the failure region, and which is preferably additionally operable for automatically controllably retracting the broken off free end into an auger drum and retaining it therein during subsequent rotation of the drum for limiting potential damage from the broken end and preventing entry of the broken end into crop handling equipment of the combine.

BACKGROUND ART

It is well known to provide stiff, hard fingers of steel or other rigid material protruding radially outwardly from a central region of a drum of a rotating crop gathering auger of a grain header of an agricultural combine, for raking crops into an inlet opening of a feeder operable for conveying the crops into a threshing system of the combine, and also for other applications such as on forage harvesters and the like. Reference generally in this regard, Farley et al., U.S. Pat. No. 6,640,527 entitled Center Feed Finger Adjustment Mechanism For Header. As illustrated in the Farley et al. patent, such fingers are typically mounted on an auger finger shaft or other element located within the auger drum in axially offset relation to a rotational axis of the drum, and protrude radially outwardly through holes in an outer cylindrical surface of the drum.

It is additionally well known to provide a failure region at a predetermined location along the length of such fingers, such as a groove or the like, such that, in the event that a large, solid or hard object such as a stone or rock, a stump or fence post or fragment thereof, an animal skeleton or part thereof, or the like, is encountered and attempted to be raked by a finger, forces exerted by the rotation of the drum applied through the finger against the object, if sufficiently strong, will cause the finger to break at the failure region. Induction of the broken off end of the finger into the feeder, and subsequent passage into the threshing system and other systems of the combine is to be avoided, as the end of the finger can jam the mechanisms thereof and/or cause damage such as breakage and result in machine downtime.

Therefore, to avoid such occurrences, the failure region is typically located within the auger drum, and the end of the finger located radially outwardly of the failure region can include a retainer or detent element, such as a pin thereacross, located within the drum, for preventing removal of the broken end of the finger from the drum. However, in the event of breakage of the finger, the broken free end of the finger can undesirably flail about the exterior of the drum during the rotation thereof, so as to strike the floor or pan of the header during the rotation resulting in annoying noise, or, if the free end falls into the drum, it can undesirably move around freely therein so as to also create annoying noise, and it can possibly damage or jam other components located therein, and be difficult to find and retrieve.

Thus, what is sought is an apparatus and method for retaining a broken free end of an auger finger, which overcomes one or more of the problems and disadvantages set forth above, and particularly, which is automatically operable for retracting the broken free end of an auger finger into a rotating auger drum and subsequently retaining the broken free end within the drum, and which is simple in construction.

SUMMARY OF THE INVENTION

What is disclosed is an auger finger with a resilient elastomeric retainer retractor for retaining a broken free end thereof, which overcomes one or more of the problems and disadvantages set forth above, and which is additionally operable for automatically and controllably retracting the broken free end into a rotating auger drum and subsequently retaining the broken free end within the drum, and which is simple in construction.

According to a preferred aspect of the invention, the auger finger includes a mounting end portion having a first sectional extent, an elongate free end portion opposite the mounting end portion, and a failure region disposed between and connecting the elongate free end portion with the mounting end portion. The failure region preferably has a second sectional extent smaller and weaker than the first sectional extent, or is otherwise weakened, so as to break and release the free end portion from the mounting end portion when the finger is subjected to a predetermined side loading condition, representative of contact with an obstruction. And, the auger finger includes at least one elastomeric retainer retractor connected to the free end portion and to the mounting end portion and spanning the failure region, the retainer retractor being constructed and operable such that, when the failure region is broken, the retainer retractor will retain the free end portion, while being resiliently flexible for allowing relative pivotal movement therebetween in a manner that facilitates retraction of the free end portion into the drum, but which substantially limits or prevents free flailing of the free end portion while extending from the drum, and after retraction into the interior thereof.

More particularly, the mounting end portion of the auger finger is preferably adapted to be mounted within a drum of an auger in connection with a support element offset axially from a rotational axis of the drum such that the failure region is also located within the drum, and the free end portion projecting radially outwardly from the drum. Importantly, in the event of breakage or failure of the failure region, the elastomeric retainer retractor connected between the free end and mounting end portions and spanning the failure region, will be capable of holding the free end portion in connection with the mounting end portion, including in opposition to forces generated as a result of rapid energy release from the breakage such that the free end portion will not fly from the drum or otherwise be lost. Further, during subsequent rotation of the drum, the retainer retractor will allow relative pivotal movement of the free end portion and the mounting end portion, and preferably at least some limited relative longitudinal movement therebetween, as required, to facilitate and control automatic retraction of the free end portion into the drum and holding of the free end in a suitable position therein, such that the finger will not undesirably flail about the exterior of the drum during subsequent rotation, or, become loosened and lost or inducted into a threshing system of a combine with which the finger is used, or flail about inside the drum when retracted therein.

According to another preferred aspect of the invention, the resilient retainer retractor comprises a member of a resiliently stretchable rubber or rubbery material. In one preferred embodiment, the rubber member is of tubular shape, and can be molded around at least portions of the free and mounting end portions of the finger adjacent to opposite ends of the failure region, and the free and mounting end portions can include recesses and/or protrusions for engaging and holding the rubbery material, for better holding the retainer retractor to the finger portions.

According to other preferred aspects of the invention, the rubber member includes one or more windows or openings therein beside the failure region of the finger, preferably facing in a predetermined direction which is the rotational direction of the drum and the opposite direction, such that, in the event of breakage of the finger, the portion or portions of the retainer retractor in the vicinity of the broken region will be less likely to be pinched between the relatively pivoting portions of the finger and punctured and/or torn by sharp edges and/or points on the thus exposed surface or surfaces thereof, or by elements or particles such as shards of the finger that may break from the finger and fly or be propelled therefrom. This directional orientation can be established when the finger is mounted in the drum. In its free state, the tubular member will retain its original tubular shape, but when subjected to bending forces resulting from bending and breaking and subsequent pivoting of the broken end portions of the finger, the portion or portions of the tubular member spanning the broken failure region are configured so as to correspondingly resiliently bend or flex while holding the broken off free end portion of the finger in connection with the mounting end portion. In a further preferred embodiment, the element or elements spanning the failure region are configured and sufficiently strong and robust for controlling relative pivotal movements of the portions of the broken finger, so as to be limited at least generally, to the direction of rotation of the drum and the opposite direction.

In still another preferred embodiment, the rubber member includes portions attached or connected to the free and mounting end portions of the finger, which preferably comprise tubular members or bands which extend therearound and are securely affixed or attached thereto using any of the above described techniques, and at least one resilient elastomeric element or tether connected to and extending between the tubular members or bands in spanning relation to the failure region, thereby defining the desired opening or openings next to the failure region. More preferably, two tethers are provided, located on opposite sides of the failure region, such that the opening or openings face both in the direction of movement, and in the opposite direction, such that contact between portions of the retainer retractor and any sharp edges or points and other projectiles emanating from the breakage region can be avoided or substantially limited if breakage occurs. Again, this directional orientation can be established when the finger is installed in the drum. The tether or tethers also preferably extend and are spaced sidewardly outwardly of the failure region, and include rounded surface portions facing the failure region, so as to lessen the possibility of damage thereto from sharp or pointy edges and or separated elements. The elements or tethers while sufficiently flexible to allow pivotal movement of the broken finger portions, are also preferably sufficiently robust so as to be capable of exerting a centering force on the broken free end portion for substantially limiting relative pivotal movements at least generally or largely to the direction of rotation of the drum and the opposite direction, and also for reducing random flailing of the broken free end portion.

DETAILED DESCRIPTION OF THE INVENTION

Figure 1:
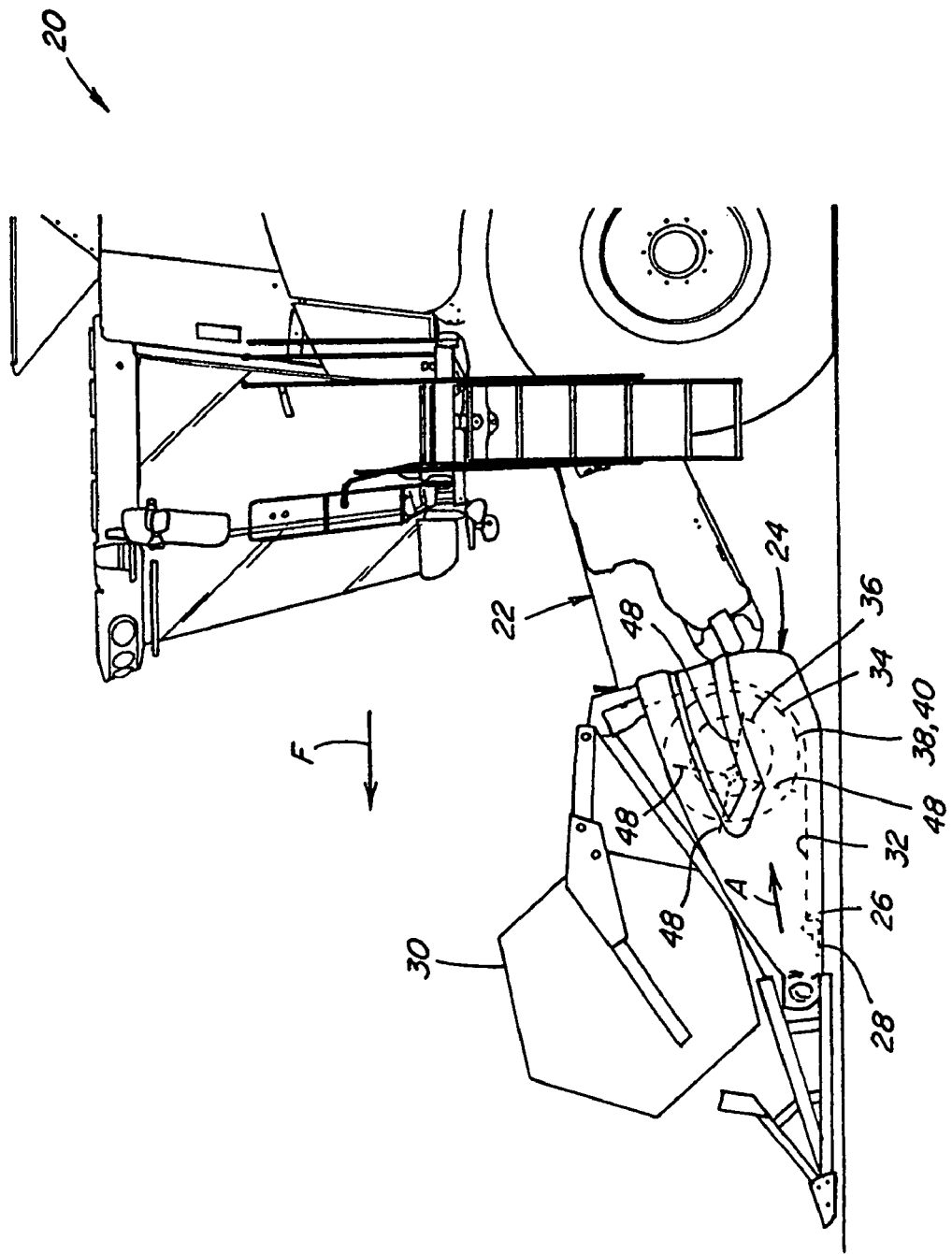
FIG. 1 is a simplified side view of a grain header supported on a feeder on the front end of an agricultural combine, and showing in dotted lines a gathering auger on the header, including an array of auger fingers of the invention extending radially outwardly from a drum of the auger at angularly spaced locations therearound.

Referring now to the drawings, in FIG. 1, the front end of a conventional agricultural combine 20 is shown, including a feeder 22 supporting a grain header 24 conventionally operable for cutting and gathering crops containing grain, such as wheat and other grasses, legumes such as soybeans, and the like, in the well known conventional manner. Header 24 has a front end 26 including cutter apparatus 28 extending along the width thereof, configured and operable for severing crops (not shown) from the ground during movement of combine 20 in a forward direction, denoted by arrow F.

Header 24 includes a reel 30 disposed above cutter apparatus 28 and rotatable for directing the cut crops rearwardly onto and along a generally flat, horizontal floor or pan 32 of header 24, into a gathering auger 34 extending across the width of the header adjacent to the rear of pan 32. Auger 34 includes a hollow cylindrical drum 36 having opposite right hand and left hand helical flights 38 and 40 extending around opposite end portions thereof, respectively. Auger 34 is rotatable about a rotational axis 42 (FIG. 2), and flights 38 and 40 are rotatable therewith for conveying crop material from opposite end regions of the header toward the center region thereof. Feeder 22 includes an inlet opening (not shown) just rearwardly of the center region of header 24, for receiving the augered crops, in the well known manner.

To facilitate flow and induction of the crops into the inlet of feeder 22, drum 36 includes an array of auger fingers 48 at longitudinally and angularly spaced locations therearound which rotate therewith and are configured to reciprocally move telescopically radially outwardly therefrom and radially inwardly therein during the rotation, for raking the crop material into feeder 22, in the well known manner.

Figure 2:
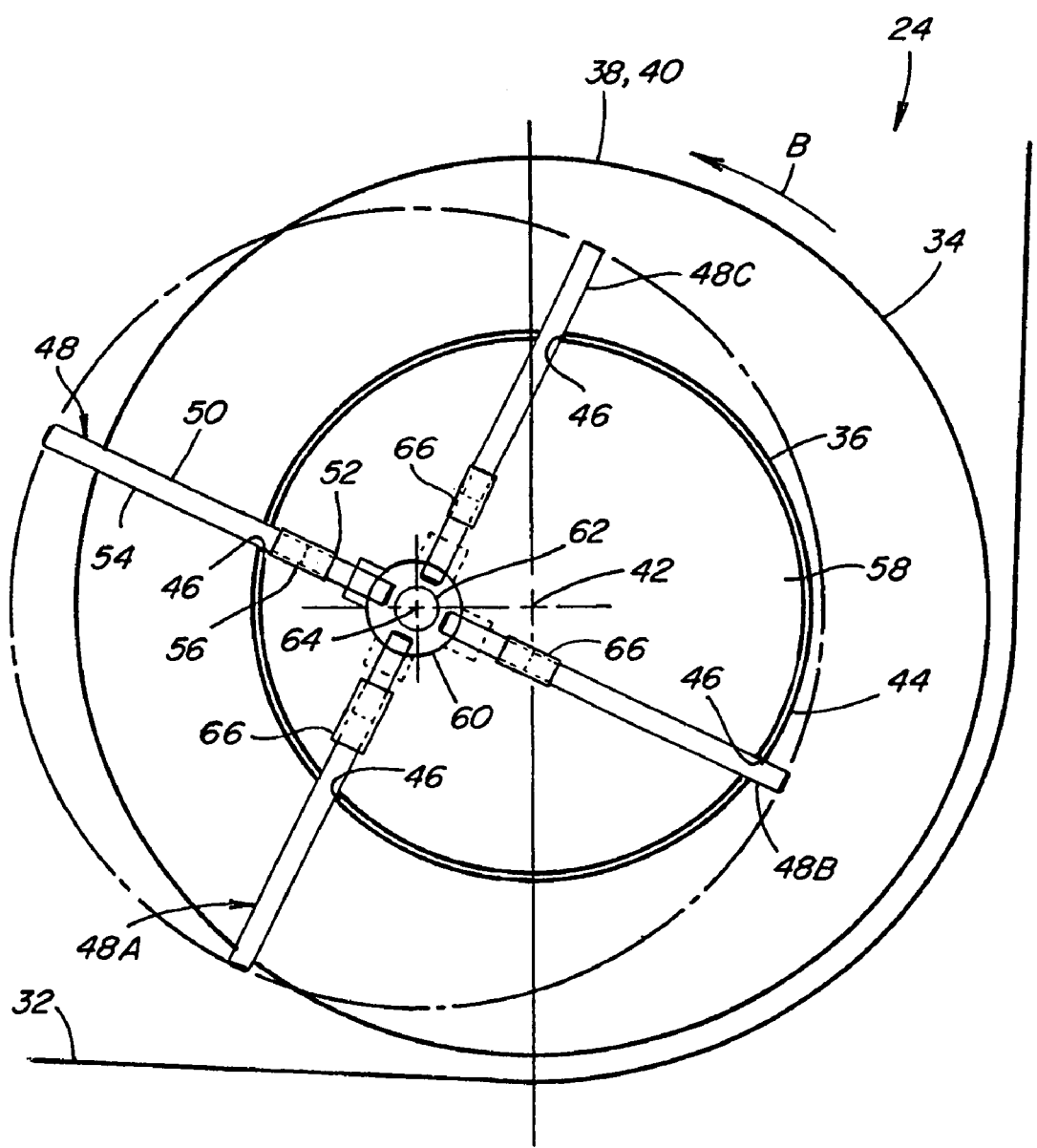
FIG. 2 is a simplified schematic side view of the header and auger of FIG. 1, illustrating one of the auger fingers at several rotational positions of the drum of the auger.

Referring also to FIG. 2, auger 34 of header 24 is shown. The rotation of auger 34 is denoted by arrow B, about axis 42 through drum 36. As noted above, drum 36 is hollow, and it includes a longitudinally and angularly spaced array of holes through an outer cylindrical surface 44 thereof, represented by hole 46. An auger finger constructed and operable according to the teachings of the invention, is positioned in and extends outwardly through each of the holes of the array, as illustrated by auger finger 48 in hole 46. As will be explained, each of the auger fingers, as represented by auger finger 48, telescopically extends outwardly through its hole, represented by a hole 46, by a different amount, depending on the rotational position of drum 36 about axis 42. To illustrate, auger finger 48 is shown in a first rotational position telescopically extending in an upwardly and forwardly directed orientation from drum 36, in preparation for raking.

The auger finger is denoted by number 48A at a second rotational position of drum 36, telescopically extending forwardly and downwardly in a raking position and orientation. The auger finger is denoted by number 48B at a third rotational position of the drum, extending rearwardly and downwardly and mostly telescopically retracted into, the drum. And, the auger is denoted by number 48C in a rearward and upwardly directed orientation re-emerging from the drum. Thus, it should be evident that by rotation of drum 36 in the direction denoted by arrow B in FIG. 2, an auger finger will project telescopically a substantial distance from drum 36 in a gathering or raking mode through a portion of a revolution of the drum, as denoted by numbers 48 and 48A, then will retract into drum 36 through another portion of the revolution, as denoted by number 48B and 48C, once the crop has been raked rearwardly into the feeder.

Referring also to FIGS. 3, 4, 5, 6, 7, 8, 9 and 10, each of the auger fingers of drum 36, represented by auger finger 48, includes an elongate rigid body 50 constructed of a suitable material such as, but not limited to, a metal such as steel or aluminum. Body 50 includes a mounting end portion 52, a free end portion 54, and a failure region 56 at a predetermined location between mounting and free end portions 52 and 54, connecting portions 52 and 54 together. Failure region 56 is preferably located in relation to mounting end portion 52, so as to be located at all times within an internal cavity 58 of drum 36, while free end portion 54 extends radially outwardly from drum 36 through the range of rotational positions thereof, as best illustrated in FIG. 2.

Figure 3:
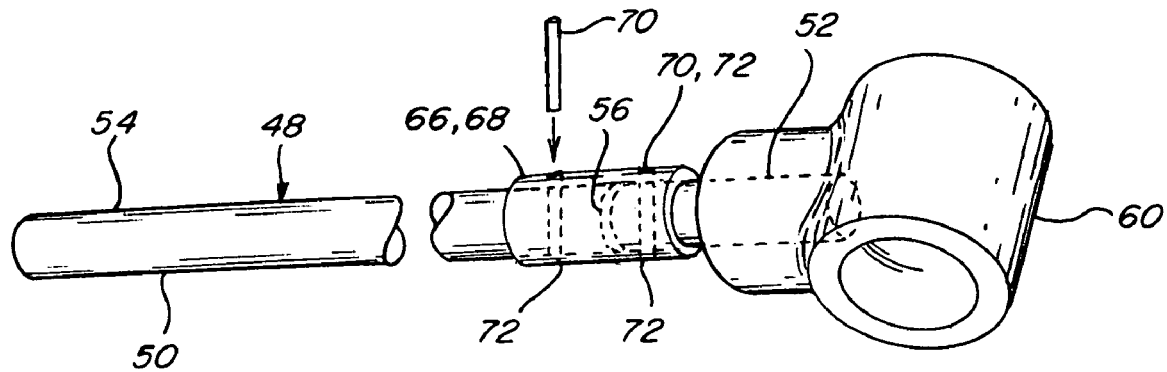
FIG. 3 is a perspective view of the auger finger of FIG. 2, shown mounted on a mounting sleeve mountable on an auger finger shaft of the drum.
Figure 4:
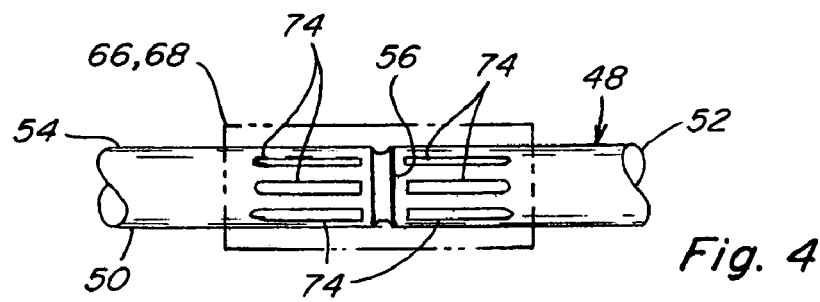
FIG. 4 is a fragmentary side view of the auger finger of FIG. 2, illustrating a retainer retractor of the invention in dotted lines to reveal one embodiment of underlying features of the finger, including a failure region thereof.
Figure 5:
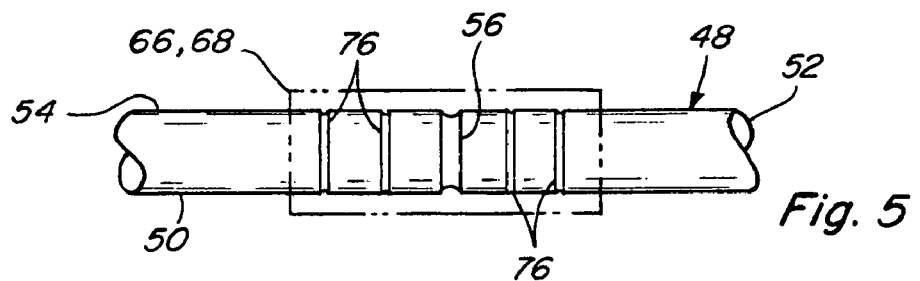
FIG. 5 is another fragmentary side view of the auger finger of FIG. 2, illustrating the retainer retractor of the invention in dotted lines to reveal an alternative embodiment of underlying features of the finger.

Mounting end portion 52 is adapted to be received and held in a hole through a side of a mounting flange or sleeve, illustrated by mounting sleeve 60 in FIGS. 2 and 3, which in turn, is mounted for rotation about a sidewardly extending auger finger shaft 62 located in internal cavity 58 of drum 36. Auger finger shaft 62 is mounted at a fixed location within internal cavity 58 in axially offset relation to axis 42, such that the mounting sleeves, represented by sleeve 60, will be rotatable about an auger finger shaft axis 64 extending longitudinally through shaft 62. Mounting end portion 52 can be secured to sleeve 60 in any desired manner, such as by using one or more commercially available roll pins or fasteners, or by threaded engagement, or the like, in the well known manner, preferably so as to enable easy and quick removal and replacement. For purposes of the invention, namely, for aligning features of the invention with the direction of rotation of the drum, the mounting end portion 52 will be securable to sleeve 60 in a particular orientation.

Figure 8:
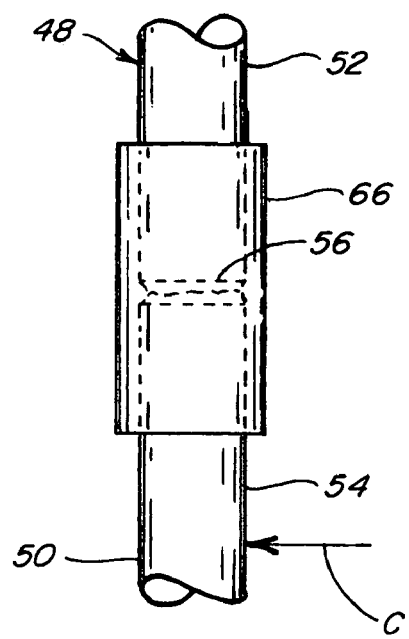
FIG. 8 is another fragmentary side view of the auger finger, illustrating breakage of the failure region.
Figure 13:
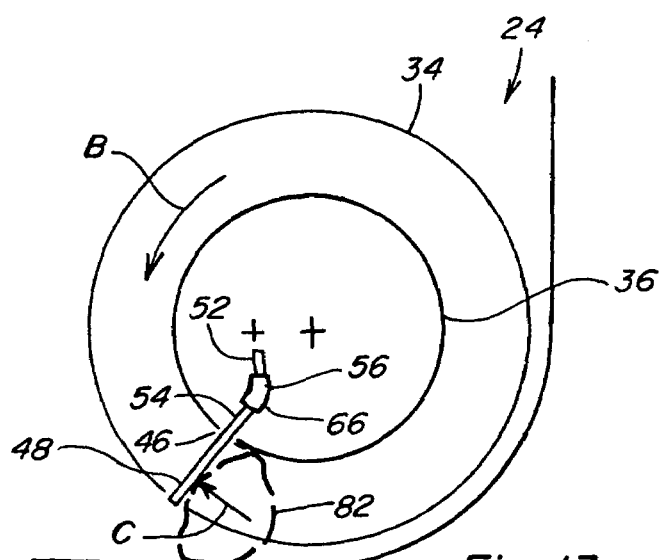
FIG. 13 is another simplified schematic side view of the header, showing still further rotation of the auger and breakage of the finger at the failure region thereof as a result of the contact with the obstacle.

Failure region 56 can comprise any suitable construction which will result in breakage of body 50 at that location as a result of application of at least a predetermined threshold side loading condition, as denoted by arrow C in FIGS. 8 and 13, the magnitude of which can be determined as required or desired for a particular application, it being understood that failure region 56 is to be weaker than at least mounting end portion 52, such that in the event of application of a side load against the finger of at least the threshold value, the finger will break at failure region 56 and not at mounting end portion 52 or another undesired location. The contemplated threshold side load force would be equivalent to that of resulting from contact with an object or obstruction not desired to be inducted into the feeder of a combine, which can include, for instance, but is not limited to, a large stone or rock, a fence post, log or stump, an animal carcass or skeleton, or a part or parts of any of these. To provide this capability, failure region 56 can comprise suitable structure, such as a circumferential groove around body 50, a notch, or the like, to provide the desired weakening so as to be subject to breakage before other portions of body 50, particularly mounting end portion 52.

As noted above, in the event of breakage of a finger, such as finger 48 at failure region 56, it is desirable for the broken or detached free end portion 54 to be retained in connection with drum 36, so as not to be subject to induction into feeder 22 and subsequent conveyance or passage into other regions of combine 20 wherein consequential damage therefrom could result. It has likewise been found to be undesirable for the broken portion of a finger to flail about the exterior of drum 36 so as to cause noise and potentially damage nearby components of header 24. Thus, it has been found to be desirable to have the capability to retract a broken segment of a finger into internal cavity 58 and to hold the broken portion therein in a position and orientation so as to cause no further damage.

This desirable capability is achieved according to the present invention by providing at least one resilient elastomeric retainer retractor 66 connected between mounting end portion 52 and free end portion 54 of each auger finger, so as to span failure region 56 thereof and hold or retain free end portion 54 in the event failure region 56 is broken. Resilient retainer retractor 66 additionally necessarily allows relative pivotal movement of mounting end portion 52 and free end-portion 54, to allow passage of free end portion 54 over an object (e.g., FIGS. 12 and 13) contact with which caused the breakage of failure region 56, and to allow and facilitate automatic retraction of free end portion 54 through hole 46 into internal cavity 58 of drum 36, by continued rotation of the drum.

Figure 6:
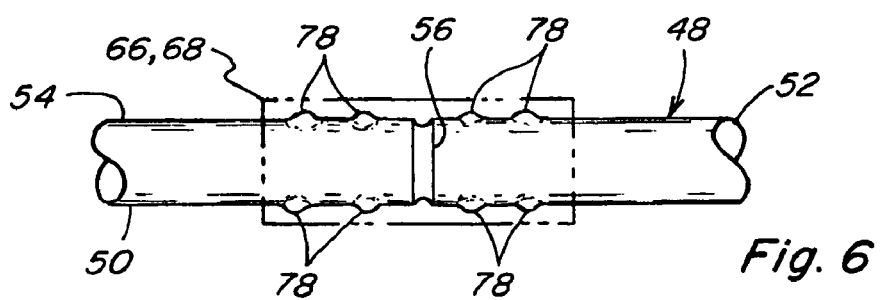
FIG. 6 is another fragmentary side view of the auger finger of FIG. 2, illustrating the retainer retractor of the invention in dotted lines to reveal another alternative embodiment of underlying features of the finger.
Figure 7:
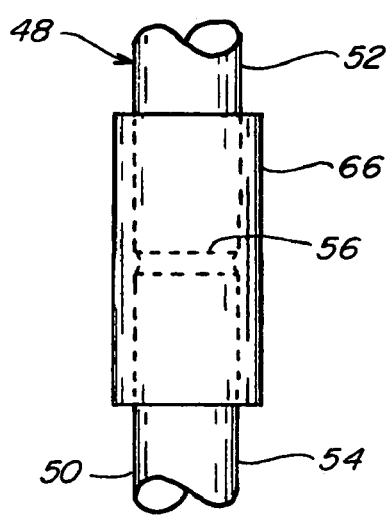
FIG. 7 is another fragmentary side view of the auger finger, illustrating the failure region thereof in dotted lines.

To provide this capability, according to one preferred embodiment of the invention, resilient elastomeric retainer retractor 66 includes a tubular member 68 of a resilient rubber or rubbery material, such as, but not limited to, natural rubber, neoprene, urethane, and combinations of the above, which is connected to or mounted on both mounting end portion 52 and free end portion 54, and spans failure region 56. Member 68 is shown as being of unitary construction, and can be held in position in connection with mounting and free end portions 52 and 54 in any of several ways, which can include, but are not limited to, friction, mechanical fasteners or elements, such as pins 70 received in holes 72 through member 68 and underlying portions of mounting end portion 52 and free end portion 54 (FIG. 3), and/or by adhesion using an adhesive such as commonly commercially available under the name Chemlock, and/or by molding, for instance, so as to occupy and conform to one or more recesses in the surfaces of mounting end portion 52 and/or free end portion 54, as illustrated by recesses 74 and 76 (FIGS. 4 and 5), and/or so as to conform to raised protrusions, such as a protrusions 78, on the surfaces of portions 52 and/or 54 (FIG. 6).

Figure 12:
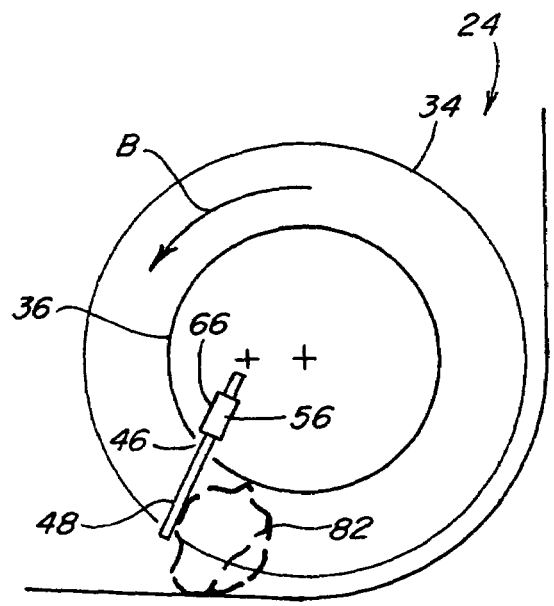
FIG. 12 is another simplified schematic side view of the header, showing still further rotation of the auger and contact of the finger with an obstacle.

In FIG. 8, failure region 56 is illustrated as being broken by application of a side load against free end portion 54, as denoted by arrow C, this can result from a variety of causes, such as by contact with an obstruction such as is illustrated in FIGS. 12 and 13.

Figure 9:
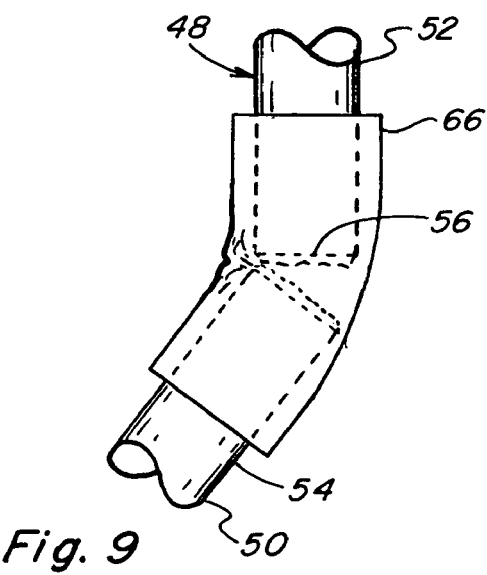
FIG. 9 is another simplified schematic side view of the auger finger showing separation of the free and mounting end portions thereof and retention of the free end portion by the retainer retractor of the invention illustrating relative pivotal movement of the mounting and free end portions thereof when the failure region is broken.
Figure 10:
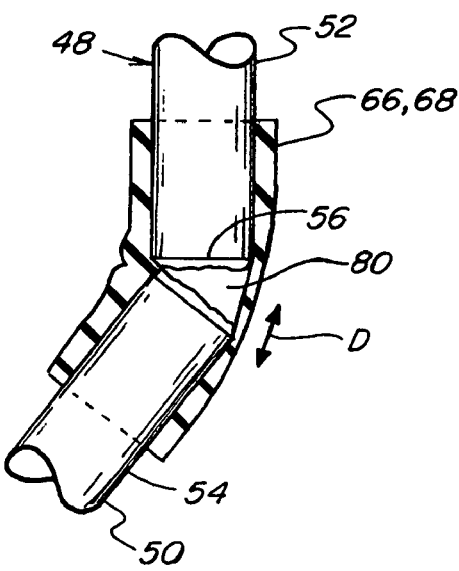
FIG. 10 is still another simplified schematic side view of the auger finger, with the retainer retractor shown in cross section to illustrate resilient stretching thereof during relative pivotal movement of the mounting and free end portions.

Referring more particularly to FIGS. 9 and 10, and also to FIGS. 11, 12, 13, 14, 15 and 16, failure or breakage of failure region 56 and resultant controlled relative pivotability of end portions 52 and 54 of finger 48 as facilitated and achieved by resilient retainer retractor 66 during rotation (arrows B) of auger 34 of header 24, is shown. Here, it should be observed that to provide the capability of easy relative pivotal movement of mounting end portion 52 and free end portion 54 in the event of breakage of failure region 56, resilient retainer retractor 66 is configured so as to be sufficiently resiliently stretchable, at least in the vicinity of failure region 56, to allow a limited amount of relative longitudinal movement of mounting end 4 portion 52 and free end portion 54, as denoted by arrow D and gap 80 in FIG. 10, as a result of contact with an object or obstruction (FIGS. 12 and 13) that is not raked by finger 48 so as to be cleared or moved from the path thereof.

Figure 11:
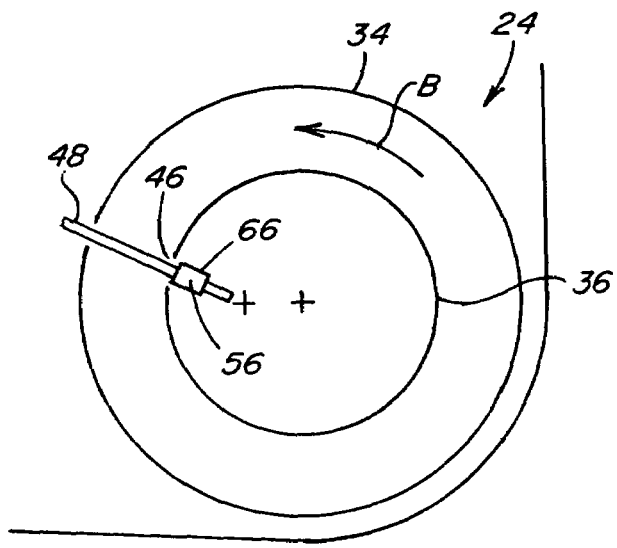
FIG. 11 is a simplified schematic side view of the header, illustrating rotation of the auger and the auger finger intact and in its normal operating position.
Figure 14:
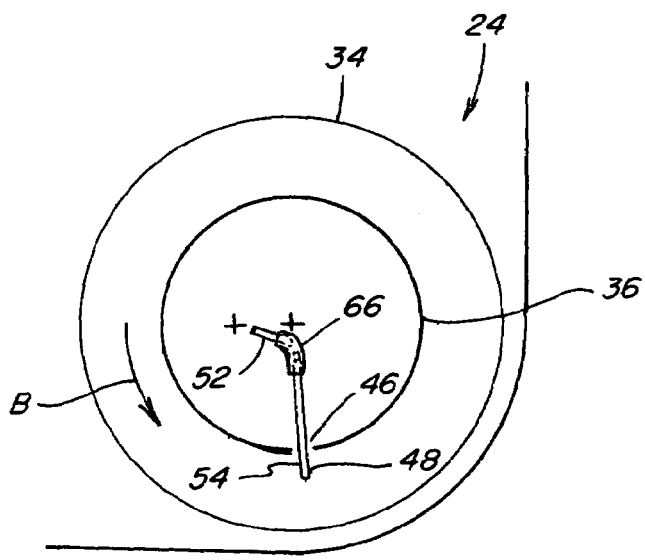
FIG. 14 is another simplified schematic side view of the header, showing still further rotation of the auger to cause partial retraction of the broken portion of the finger into a drum of the auger by the retainer retractor.

Referring more particularly to FIG. 11, failure region 56 within retainer retractor 66 of finger 48 is shown intact, finger 48 projecting outwardly through hole 46 in drum 36 of auger 34 rotating in direction B. In FIG. 12, failure region 56 is shown still intact, as finger 48 initially contacts an obstruction 82 in its path. Referring to FIG. 13, with further rotation of auger 34 as denoted by arrow B, a side load, denoted by arrow C, is exerted against free end portion 54 by contact with obstruction 82, resulting in breakage of failure region 56, and an initial relative pivotal movement of free end portion 54 and mounting end portion 52 as enabled and controlled by retainer retractor 66 which also retains free end portion 54 on mounting end portion 52. Here, the side load denoted by arrow C is illustrated as being exerted in the direction opposite that of the rotation of the drum denoted by arrow B. In FIG. 14, during further rotation of auger 34 as denoted by arrow B, free end portion 54 is further pivoted and is beginning to be retracted through hole 46 of drum 36, while still being retained by retainer retractor 66.

Figure 15:
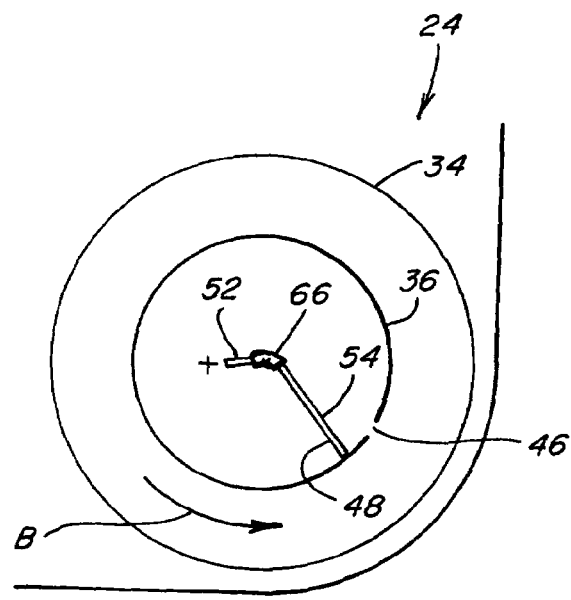
FIG. 15 is another simplified schematic side view of the header, showing the broken finger portion fully retracted into the drum by the retainer retractor.

FIG. 15 illustrates further pivoting of free end portion 54 relative to mounting end portion 52, as allowed and controlled by retainer retractor 66, and the complete retraction of free end portion 54 through hole 46 of drum 36, during further rotation of auger 34 in direction B.

Figure 16:
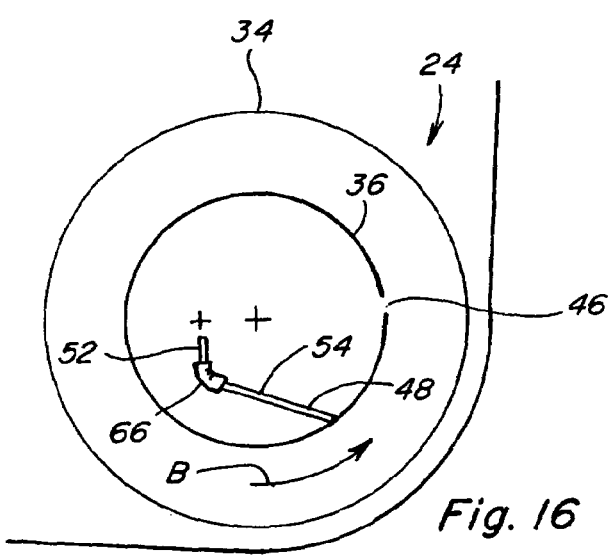
FIG. 16 is another simplified schematic side view of the header, showing a resting position of the broken finger portion within the drum as facilitated by the retainer retractor.

FIG. 16 show the position of free end portion 54 of finger 48 within the interior of drum 36 during subsequent rotation of auger 34, as denoted by arrow B.

This sequence is intended to be illustrative of a wide variety of incidents that may result in breakage of a finger, and the failure region of the fingers will desirably be constructed so as to fail when a side loading force thereagainst resulting from contact with an object or obstruction corresponding to a large stone or rock, a fence post, log or stump, an animal carcass or skeleton, or a part or parts of any of these, is generated.

Additionally, it has been found that when an auger finger breaks, the free and mounting ends can pivot one relative to the other very rapidly, in a snapping action. It has also been found that the broken surfaces in the failure region can include sharp edges and/or points, and further that small particles or elements of the finger can break free and shoot outwardly from the break so as to possibly puncture the retainer retractor and induce tearing and possibly failure thereof.

Figure 17:
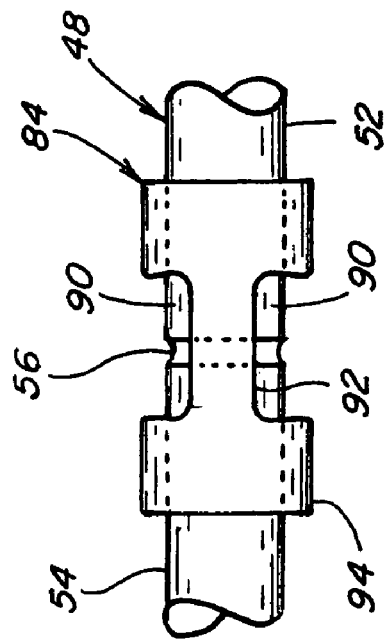
FIG. 17 is a fragmentary side view of another embodiment of the auger finger of FIG. 2, illustrating another embodiment of a retainer retractor of the invention.
Figure 17A:
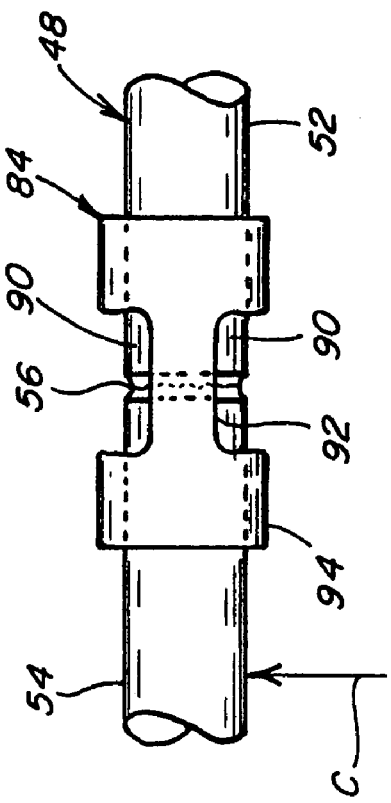
FIG. 17a is another fragmentary side view of the auger finger and retainer retractor of FIG. 17, illustrating application of a side force against the finger causing breakage of the failure region thereof.
Figure 17B:
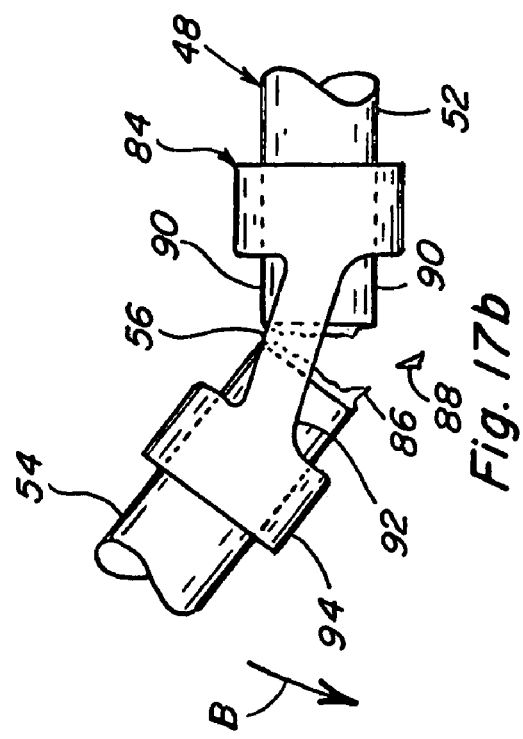
FIG. 17b is another fragmentary side view of the auger finger and retainer retractor of FIG. 17, illustrating breakage of the failure region and pivotal movement of the end portions of the finger as retained by the retainer retractor.

Referring to FIGS. 17, 17*a* and 17*b*, auger finger 48 is shown including a second embodiment of a retainer retractor 84 constructed and operable according to the teachings of the present invention, like parts of retainer retractor 84 and retainer retractor 66 being identified by like numbers. Retainer retractor 84 is connected between mounting end portion 52 and free end portion 54 of auger finger 48, so as to span failure region 56 thereof and hold or retain free end portion 54 in the event failure region 56 is broken, as illustrated in FIGS. 17*a* and 17*b*. Retainer retractor 84 has resilient properties to move with and thereby allow relative pivotal movement of broken apart mounting end portion 52 and free end portion 54 (FIG. 17*b*), to allow passage of free end portion 54 over an object (e.g., FIGS. 12 and 13) contact with which caused the breakage of failure region 56 (e.g. resulting from application of a side load C), and to allow and facilitate automatic retraction of free end portion 54 through hole 46 into internal cavity 58 of drum 36, by continued rotation of the drum. Additionally, in the event of breakage of failure region 56, to prevent or limit penetration or puncturing of retainer retractor 84 by sharp edges or points on the surface of the failure region, represented by a sharp edge 86, and/or flying particles or elements, represented by shard 88, retainer retractor 84 includes at least one opening 90 beside failure region 56, and preferably two openings 90, preferably oriented to face in the direction of rotation of the drum, as denoted by arrow B, and in the opposite direction, respectively. The provision of openings 90 in the rotational direction in which the end portions of the finger are anticipated to pivot facilitates the pivoting action, and leaves a pair of resiliently flexible elements or tethers 92 extending across failure region 56 which will allow the pivoting movement, but are also operable for retaining free end portion 54 in connection with mounting end portion 56 for facilitating the retraction of free end portion 54 into the rotating drum. Retainer retractor 84 preferably comprises a tubular member 94 of a resilient rubber or rubbery material, such as, but not limited to any of the materials set forth above, namely, natural rubber, neoprene, urethane or a combination thereof, which is connected to or mounted on both mounting end portion 52 and free end portion 54 adjacent to failure region 56. Member 94 is shown as being of unitary construction, and can be held in position in connection with mounting and free end portions 52 and 54 in any of several ways, which can include, but are not limited to, friction, mechanical fasteners or elements, such as pins 70 (FIG. 3), and/or by adhesion using an adhesive such as Chemlock, and/or by molding, for instance, so as to occupy and conform to one or more recesses in the surfaces of mounting end portion 52 and/or free end portion 54, as illustrated by recesses 74 and 76 (FIGS. 4 and 5), and/or so as to conform to raised protrusions, such as a protrusions 78, on the surfaces of portions 52 and/or 54 (FIG. 6).

Figure 18:
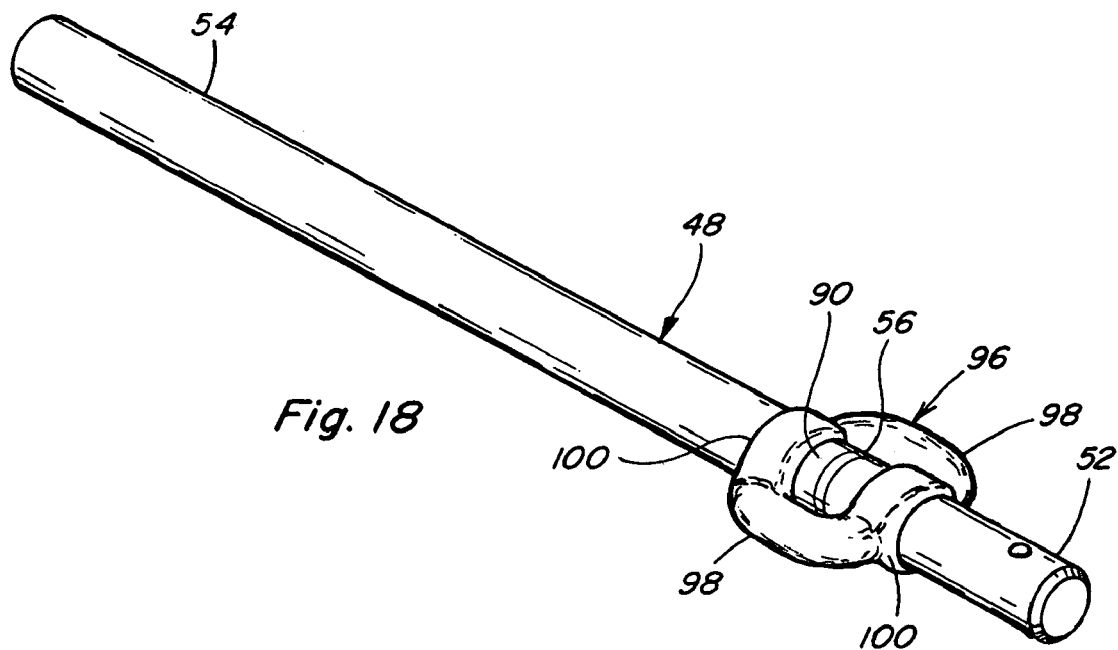
FIG. 18 is a perspective view of an auger finger including another embodiment of a retainer retractor of the invention.
Figure 18A:
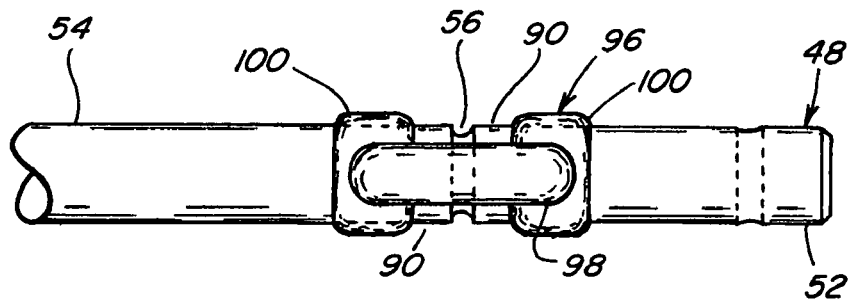
FIG. 18a is a side view of the auger finger and retainer retractor of FIG. 18.
Figure 18B:
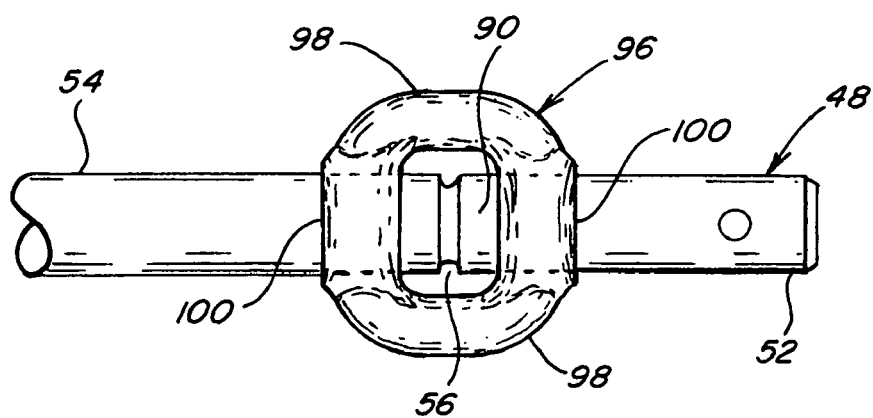
FIG. 18b is a top view of the auger finger and retainer retractor of FIG. 18.
Figure 18C:
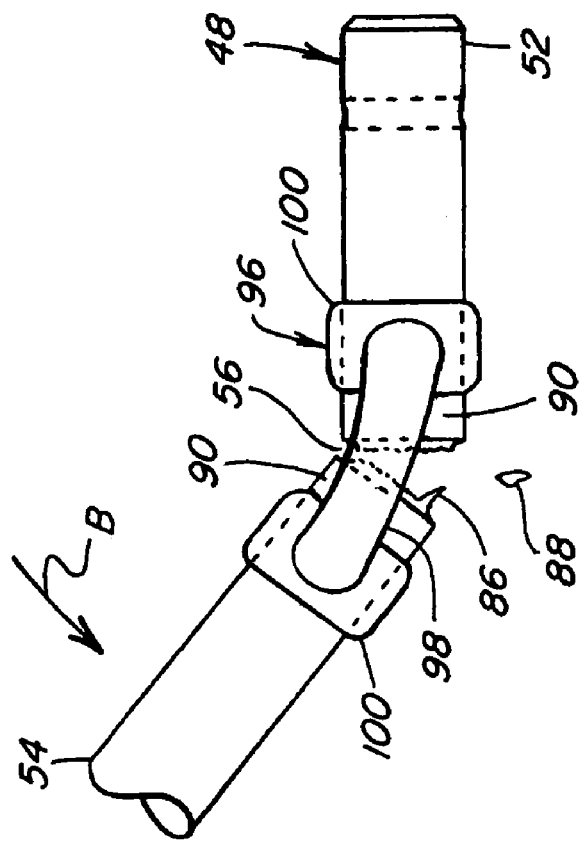
FIG. 18c is a side view of the auger finger and retainer retractor of FIG. 18, illustrating breakage of the failure region and relative pivoting of the mounting and free end portions of the finger as retained by the retainer retractor.
Figure 18D:
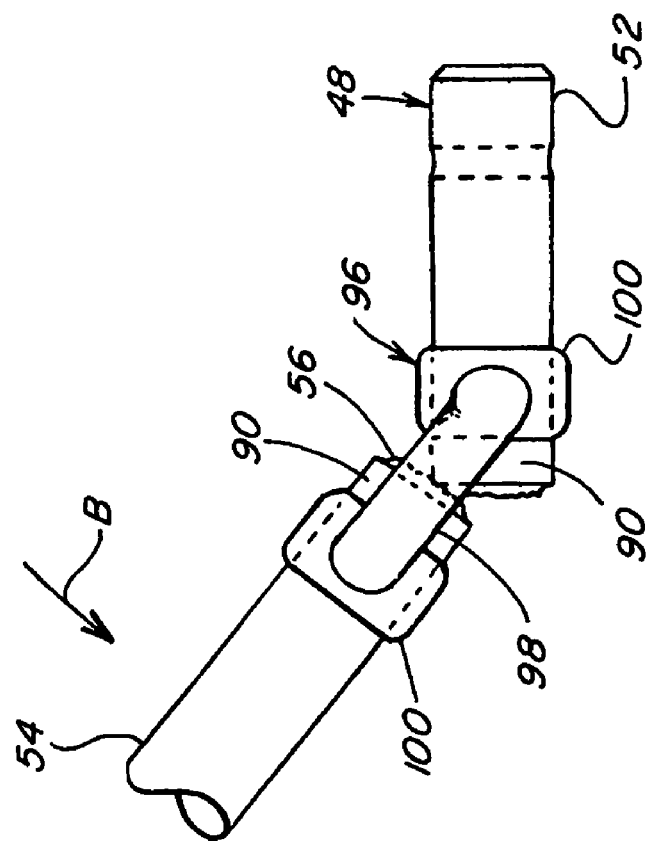
FIG. 18d is another side view of the auger finger and retainer retractor of FIG. 18, illustrating breakage of the failure region and further relative pivoting of the mounting and free end portions of the finger as retained by the retainer retractor.

Referring also to FIGS. 18, 18a, 18b, 18c and 18d, auger finger 48 is shown including a third embodiment of a retainer retractor 96 constructed and operable according to the teachings of the present invention, like parts of retainer retractor 96 and retainer retractors 66 and 84 being identified by like numbers. Retainer retractor 96 is connected between mounting end portion 52 and free end portion 54 of auger finger 48, so as to span failure region 56 thereof and hold or retain free end portion 54 in the event failure region 56 is broken, as illustrated in FIGS. 18c and 18d. Retainer retractor 96 has resilient properties to allow relative pivotal movement of mounting end portion 52 and free end portion 54, to allow passage of free end portion 54 over an object (e.g., FIGS. 12 and 13) contact with which caused the breakage of failure region 56, and to allow and facilitate automatic retraction of free end portion 54 through hole 46 into internal cavity 58 of drum 36, by continued rotation of the drum. Additionally, in the event of breakage of failure region 56, to prevent or limit penetration or puncturing of retainer retractor 96 by sharp edges or points on the surface of the failure region, represented by a sharp edge 86, and/or flying particles or elements, represented by shard 88, retainer retractor 96 defines at least one opening 90 beside failure region 56, and preferably two openings 90, again preferably oriented to face in the direction of rotation of the drum denoted by arrow B in FIGS. 18c and d, and in the opposite direction, respectively. Openings 90 are defined on the sides by a pair of resiliently flexible elements 98 extending across failure region 56, which elements 98 are configured and operable for retaining free end portion 54 in connection with mounting end portion 56 in the event of breakage of the finger, while allowing pivotal movement of the broken portions sufficient for the automatic retraction of free end portion 54 into the rotating drum. Retainer retractor 96 can also be composed of, for instance a natural rubber, neoprene, urethane, or combination thereof, and includes a pair of members or bands 100 connected to or mounted on mounting end portion 52 and free end portion 54, respectively. Retainer retractor 96 is shown as being of unitary construction, and bands 100 are affixed in position in connection with mounting and free end portions 52 and 54 in any of several ways, which can include, but are not limited to, friction, mechanical fasteners or elements, such as pins 70 (FIG. 3), and/or by adhesion using an adhesive such as Chemlock, and/or by molding, for instance, so as to occupy and conform to one or more recesses in the surfaces of mounting end portion 52 and/or free end portion 54, as illustrated by recesses 74 and 76 (FIGS. 4 and 5), and/or so as to conform to raised protrusions, such as a protrusions 78, on the surfaces of portions 52 and/or 54 (FIG. 6). Elements 98 are preferably integrally formed with bands 100, are configured to have a relatively large sectional extent for strength and robustness, and are spaced outwardly of failure region 56. This combination of features is advantageous as it provides strength to resist the forces that can be exerted to separate the broken portions of the finger, and it provides a self centering capability to control or limit the directions in which the broken finger portions can be pivoted, at least generally or largely to the rotational direction denoted by arrow B and the opposite direction. As an example, for a finger of aluminum or steel having a sectional thickness or extent of about 10 to 15 mm, each of elements 98 of a preferred embodiment will have a sectional thickness of about 10 mm. Also again, for orienting openings 90 so as to face in the desired direction of rotation and the opposite direction, the finger will preferably be mountable in a predetermined orientation, as discussed in reference to FIG. 3 above.

It will be understood that changes in the details, materials, steps, and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

What is claimed is:

1. An auger finger, comprising:
   a mounting end portion having a first sectional extent;
   an elongate free end portion opposite the mounting end portion;
   a failure region disposed between and connecting the elongate free end portion with the mounting end portion, the failure region having a second sectional extent smaller and weaker than the first sectional extent so as to break and release the free end portion from the mounting end portion when the finger is subjected to a predetermined side loading condition; and
   at least one resilient elastomeric retainer retractor, wherein the retainer retractor is a unitary tubular member, further wherein the tubular member is molded around at least portions of the free and mounting end portions of the finger adjacent to opposite ends of the failure region thereby portion and spanning the failure region, the retainer retractor being configured so as to be operable when the failure region is broken for retaining the free end portion on the mounting end portion, while being resiliently bendable for allowing relative pivotal movement therebetween.

2. The auger finger of claim 1, wherein the retainer retractor comprises a resiliently stretchable rubbery material.

3. The auger finger of claim 1, wherein the tubular member is molded into recesses in the portions of the free end portion and the mounting end portion of the finger adjacent to opposite ends of the failure region.

4. The auger finger of claim 1, wherein the at least one resilient elastomeric retainer retractor defines at least one opening therethrough beside the failure region of the finger.

5. The auger finger of claim 1, wherein the mounting end portion of the finger is mounted in an internal cavity of a hollow drum of an auger rotatable about a rotational axis generally perpendicular to an axis through the mounting and free end portions of the finger, such that the failure region is located within the cavity and the free end portion extends outwardly from a hole in the drum.

6. The auger finger of claim 5, wherein the elastomeric retainer retractor is configured such that if the failure region breaks during rotation of the drum the free end portion of the auger finger will automatically retract the through the hole and into the cavity within about one further revolution of the drum because of the centrifugal forces acting upon the auger finger and the centrifugal forces will thereafter retain the free end portion in the cavity.

7. The auger finger of claim 1, wherein the elastomeric retainer retractor comprises elements connected to the free end portion and the mounting end portion of the finger, respectively, and at least one resilient elastomeric element connected to and extending between the elements and spanning the failure region in spaced relation thereto.

8. The auger finger of claim 7, comprising two of the resilient elastomeric elements spanning opposite sides of the failure region of the finger, respectively, the resilient elastomeric elements being configured so as to be resiliently bendable to allow relative pivotal movement of the free end portion and the mounting end portion of the finger.

9. The auger finger of claim 8, wherein the two resilient elastomeric elements are each spaced sidewardly outwardly from the failure region and are configured so as to be more easily resiliently bent simultaneously by about the same amount about an axis extending through the opposite sides of the failure region, compared to being bent unevenly about an axis through other sides of the failure region.

10. The auger finger of claim 1, wherein the tubular member is molded to conform to raised protrusions in the portions of the free end portion and the mounting end portion of the finger adjacent to opposite ends of the failure region.

11. An auger finger, comprising:
an elongate rigid body including a mounting end portion, a free end portion opposite the mounting end portion, and a failure region at a predetermined location between the mounting end portion and the free end portion and connecting the mounting end portion and the free end portion, the failure region being constructed so as to break and disconnect the free end portion from the mounting end portion when subjected to a predetermined side loading condition which is less than a side loading condition required for breaking at least the mounting end portion; and
at least one resilient elastomeric retainer retractor, wherein the retainer retractor is a unitary tubular member, further wherein the tubular member is molded around at least portions of the free and mounting end portions of the finger adjacent to opposite ends of the failure region thereby spanning and the mounting the failure region and hold the free end portion when the failure region is broken, while allowing relative pivotal movement of the free end portion and the mounting end portion about the broken failure region.

12. The auger finger of claim 11, wherein the finger is mounted in an internal cavity of a rotatable hollow drum of an auger of a grain header for an agricultural combine, such that the failure region is located within the cavity and the free end portion extends outwardly from the drum, the at least one resilient retainer retractor being configured such that if the failure region is broken and the drum is further rotated, the retainer retractor will retract the free end portion into the cavity during the further rotation and thereafter retain the free end portion in the cavity.

13. The auger finger of claim 12, wherein the elastomeric retainer retractor is configured such that if the failure region breaks during rotation of the drum the free end portion of the auger finger will automatically retract through the hole and into the cavity within about one further revolution of the drum because of the centrifugal forces acting upon the auger finger and the centrifugal forces will thereafter retain the free end portion in the cavity.

14. The auger finger of claim 11, wherein the failure region comprises a groove in the finger.

15. The auger finger of claim 11, wherein the retainer retractor is resiliently stretchable so as to allow limited relative longitudinal movement between the mounting end portion and the free end portion when the failure region is broken, to facilitate the relative pivotal movement of the free end portion and the mounting end portion about the broken failure region.

16. The auger finger of claim 11, wherein the retainer retractor comprises a rubber member.

17. The auger finger of claim 16, wherein the rubber member is molded into cavities in the free end portion and the mounting end portion.

18. The auger finger of claim 11, wherein the at least one resilient elastomeric retainer retractor includes at least one element defining at least one opening through the retainer retractor beside the failure region of the finger and facing in a predetermined direction, the at least one element being configured for allowing relative pivoting of the free and mounting end portions of the more easily in the predetermined direction compared to other directions.

19. The auger finger of claim 11, wherein the elastomeric retainer retractor comprises elements extending around the free end portion and the mounting end portion of the finger, respectively, and at least one resilient elastomeric element connected to and extending between the elements extending around the free and mounting end portions so as to span the failure region of the finger.

20. The auger finger of claim 19, comprising two of the resilient elastomeric elements disposed so as to span opposite sides of the failure region of the finger and defining an opening between the resilient elastomeric elements facing in a predetermined direction, wherein the resilient elastomeric elements are configured so as to allow more easily relatively pivoting the free end portion and the mounting end portion of the finger in the predetermined direction compared to other directions.

21. The auger finger of claim 20, wherein the elastomeric elements are spaced sidewardly outwardly from the failure region.

22. An auger of a header for an agricultural combine, comprising:
a rotatable hollow drum;
at least one auger finger including an elongate rigid body including a mounting end portion, a free end portion opposite the mounting end portion, a failure region at a predetermined location between the mounting end portion and the free end portion and connecting the mounting end portion and the free end portion, the failure region being constructed so as to break and disconnect the free end portion from the mounting end portion when subjected to a predetermined side loading condition which is less than a side loading condition required for breaking at least the mounting end portion, and at least one retainer retractor of a resilient rubbery material, wherein the retainer retractor is a unitary tubular member, further wherein the tubular member is molded around at least portions of the free and mounting end portions of the finger adjacent to opposite ends of the failure region thereby spanning portion the failure region and hold the free end portion when the failure region is broken, while allowing relative pivotal movement of the free end portion and the mounting end portion about the broken failure region; and wherein the mounting end of the at least one auger finger is mounted in an internal cavity of the rotatable hollow drum such that the failure region is located within the cavity and the free end portion extends outwardly from the drum, such that if the failure region is broken during rotation of the drum the retainer retractor will retract the free end portion into the cavity and retain the free end portion in the cavity.

23. The auger of claim 22, wherein the at least one retainer retractor will allow limited relative longitudinal movement between the free and mounting end portions when the failure region is broken, to facilitate the relative pivotal movement of the free and mounting end portions about the broken failure region.

24. The auger of claim 22, wherein the failure region comprises a groove in the finger.

25. The auger of claim 22, wherein the retainer retractor is molded into cavities in the free and mounting end portions.

26. The auger of claim 22, wherein the retainer retractor comprises at least one opening therethrough beside the failure region of the finger.

27. The auger of claim 22, wherein the retainer retractor comprises bands extending around the free end portion and the mounting end portion of the finger, respectively, and at least one rubber tether connected to and extending between the bands so as to span the failure region of the finger.

28. The auger of claim 27, comprising two of the tethers disposed so as to span opposite sides of the failure region of the finger, respectively, so as to allow relative pivotal movement of the free end portion and the mounting end portion of the finger in a direction between the tethers.

29. The auger of claim 27, wherein the tethers are spaced sidewardly outwardly from the failure region.

30. A method of operation of a gathering auger of a header of an agricultural combine, comprising steps of:

providing at least one elongate auger finger having a mounting end portion, a free end portion opposite the mounting end portion, a failure region at a predetermined location between the mounting end portion and the free end portion, and providing at least one retainer retractor of a resilient rubbery material, wherein the retainer retractor is a unitary tubular member further wherein the tubular member is molded around at least portions of the free and mounting end portions of the finger adjacent to opposite ends of the failure region thereby spanning the failure region, the retainer retractor being configured for holding the free end portion to the mounting end portion while allowing relative pivotal movement therebetween if the failure region is broken, the mounting end portion of the finger being mounted on an element in an internal cavity of a rotatable hollow drum of the auger such that the failure region and the at least one retainer retractor are located within the cavity and the free end portion extends outwardly from the drum through a hole in an outer surface thereof; and responsive to breakage of the failure region, and during subsequent rotation of the drum, the free end portion of the auger finger will automatically retract free end portion into the cavity because of the centrifugal forces acting upon the auger finger and the centrifugal forces will retain the free end portion in the cavity.

31. An auger finger, comprising:

a mounting end portion having a first sectional extent;

an elongate free end portion opposite the mounting end portion;

a failure region disposed between and connecting the elongate free end portion with the mounting end portion, the failure region having a second sectional extent smaller and weaker than the first sectional extent so as to break and release the free end portion from the mounting end portion when the finger is subjected to a predetermined side loading condition; and at least one resilient elastomeric retainer retractor, wherein the retainer retractor comprises tubular bands extending around the free end portion and the mounting end portion of the finger adjacent to opposite ends of the failure region, respectively, and at least one rubber tether connected to and extending between the bands so as to span the failure region of the finger, wherein the tether is integrally formed with the bands and further wherein the tether is spaced sidewardly outwardly from the failure region, whereby the tether forms a curvilinear shape, the retainer retractor being configured so as to be operable when the failure region is broken for retaining the free end portion on the mounting end portion, while being resiliently bendable for allowing relative pivotal movement therebetween.

* * * * *